United States Patent [19]

Slepian

[11] Patent Number: 4,753,576
[45] Date of Patent: Jun. 28, 1988

[54] MAGNETOFLUIDYNAMIC GENERATOR FOR A FLOW COUPLER

[75] Inventor: Robert M. Slepian, Monroeville Boro, Pa.

[73] Assignee: Westinghouse Electric Corp., Pittsburgh, Pa.

[21] Appl. No.: 896,028

[22] Filed: Aug. 13, 1986

[51] Int. Cl.⁴ ............................................. H02K 44/00
[52] U.S. Cl. ................................ 417/50; 165/104.28; 376/404
[58] Field of Search ........................... 417/50; 376/404; 165/104.28

[56] References Cited

U.S. PATENT DOCUMENTS

| 2,655,107 | 10/1953 | Godbold . |
| 3,005,313 | 10/1961 | Carlson, Jr. . |
| 3,034,002 | 5/1962 | Carlson, Jr. . |
| 3,115,837 | 12/1963 | Campana . |
| 3,179,824 | 4/1965 | Stuetzer . |
| 3,214,615 | 10/1965 | Way . |
| 3,216,182 | 11/1965 | Cochran et al. . |
| 3,248,578 | 4/1966 | Brill et al. . |
| 3,432,694 | 3/1969 | Bidard . |
| 3,567,339 | 3/1971 | Paine . |
| 4,294,658 | 10/1981 | Humphreys et al. ............... 376/404 |

FOREIGN PATENT DOCUMENTS 745460 2/1956 United Kingdom .
905940 9/1962 United Kingdom .

OTHER PUBLICATIONS

Davidson et al., DF Sodium Electrotechnology, Nuclear Energy, vol. 20, 2/1981, pp. 79–90.
EPRI "A Proposed Concept for Economical Breeder Planks", by R. K. Winkleblack, Dec. 19, 1980.
EPRI "High-Efficiency DC Electromagnetic Pumps and Flow Couplers for LMFBRs", by I. R. McNab and C. C. Alexion, Jan., 1981.
"Demonstration of a Flow Coupler for the LMFBR", by R. D. Nathenson, C. C. Alexion, A. R. Keeton, and O. E. Gray, III.

Primary Examiner—Albert W. Davis, Jr.

[57] ABSTRACT

A pump assembly is disclosed for transferring the internal energy from a second or intermediate liquid metal to a first or primary liquid metal. The pump assembly comprises a pump duct for receiving the first liquid metal and a primary generator duct for receiving a first flow of the pumped, intermediate liquid metal. A first or main means in the illustrative form of a plurality of field coils generates and applies a main magnetic field through the pump and the primary generator ducts, whereby a first current flow is established through the pump and primary generator ducts and the primary liquid metal is pumped. An auxiliary generator duct receives a second flow of the pumped, intermediate liquid metal. An auxiliary means, illustratively in the form of permanent magnets, generates an auxiliary magnetic field through the auxiliary generator duct, whereby the interaction of the auxiliary magnetic field and the second flow of the pumped, intermediate liquid metal generates a second current flow to excite the field coils.

16 Claims, 5 Drawing Sheets

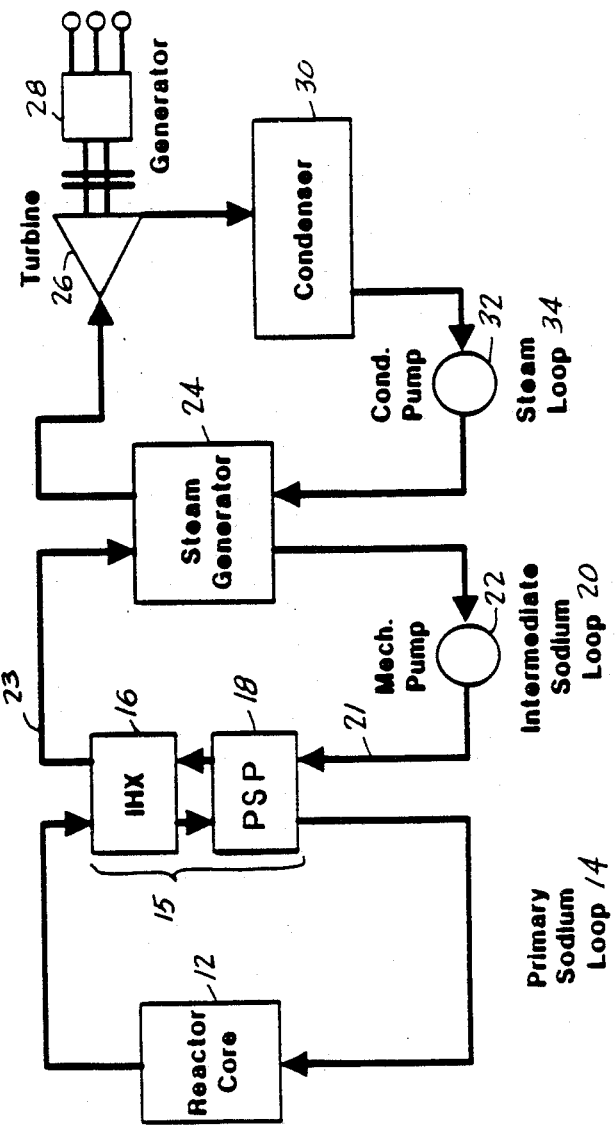

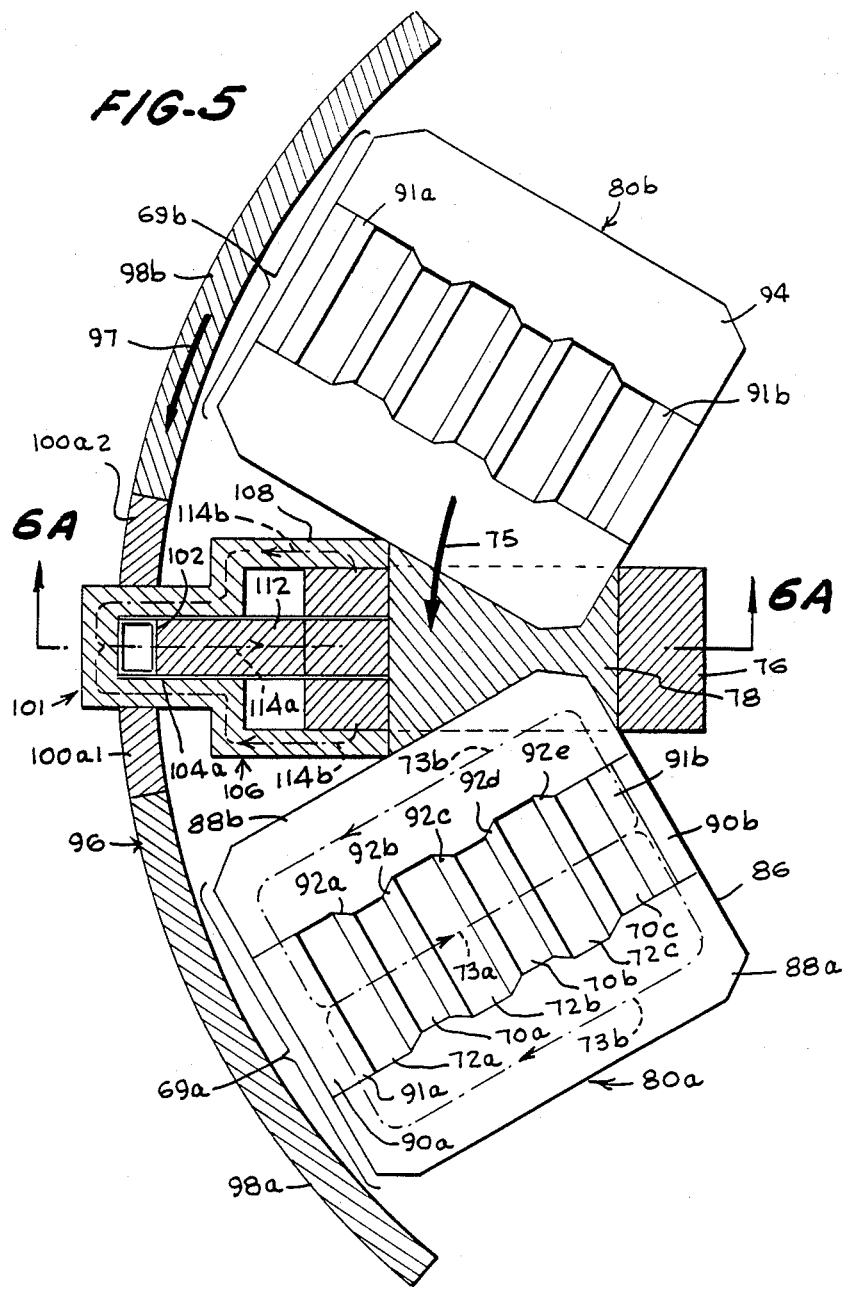

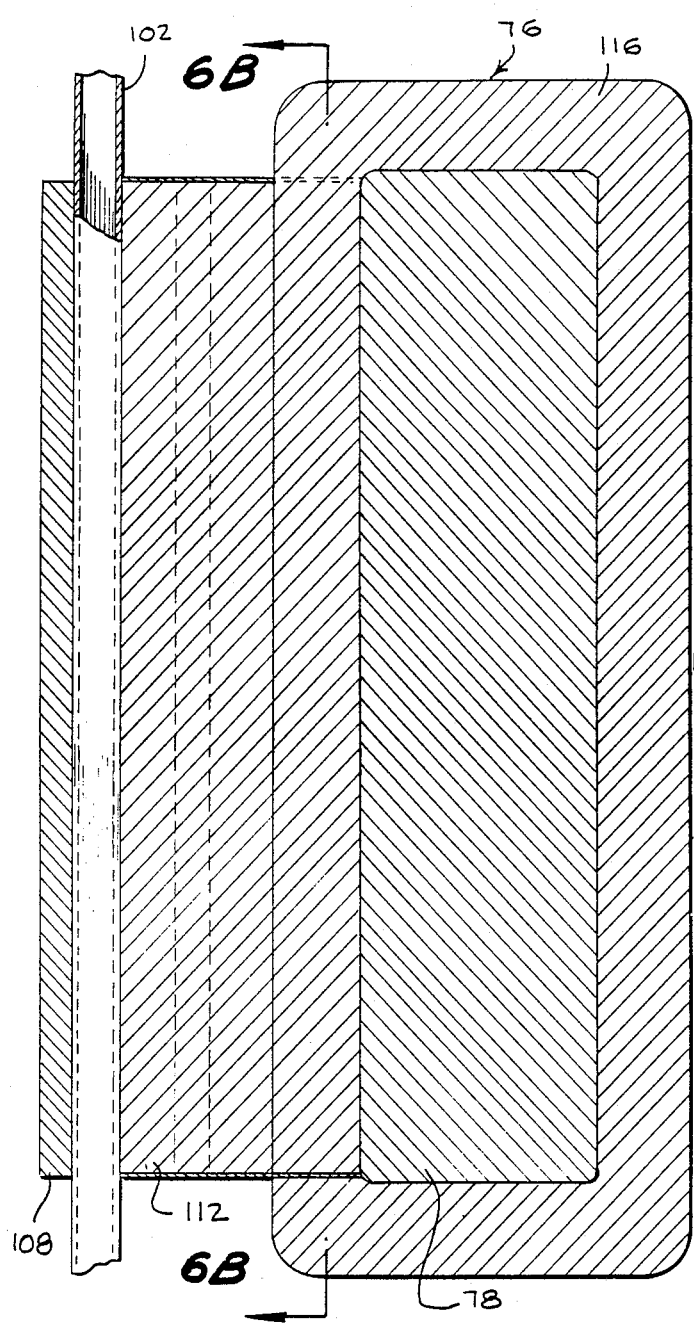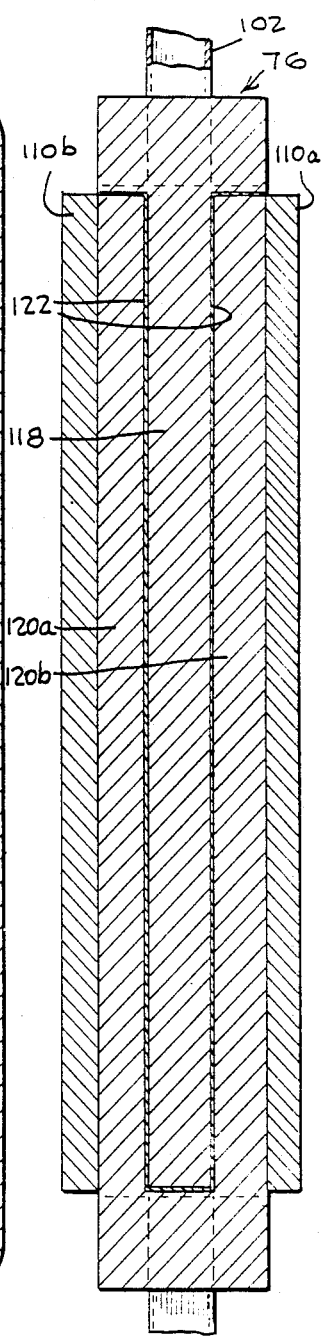

MAGNETOFLUIDYNAMIC GENERATOR FOR A FLOW COUPLER

BACKGROUND OF THE INVENTION

Field of the Invention

This invention related to flow couplers for coupling first and second flows of electrically conductive liquids such as the primary and intermediate liquid metals of a nuclear reactor, to pump the first flow. More specifically, this invention utilizes a portion of the second flow of the electrically conductive liquid to excite the magnetic coil(s) thus providing a magnetic field to the first and second flows of the electrically conductive liquids.

Reference to Co-pending Applications

Reference is made to the following co-pending, commonly assigned patent applications:

(1) U.S. Ser. No. 822,183, entitled "Electromagnetic Flow Coupler for, Regulating Flow Rate/Pressure," filed Jan. 24, 1986 now U.S. Pat. No. 4,688,996 in the names of C. C. Alexion and R. D. Nathenson;

(2) U.S. Ser. No. 875,151, pending entitled "A Pump-/Intermediate Heat Exchanger Assembly For A Liquid Metal Reactor," filed June 17, 1986 in the names of R. D. Nathenson, C. C. Alexion and W. C. Sumpman; and 3) U.S. Ser. No. 875,150, pending entitled "Pump-/Heat Exchanger Assembly for Pool-Type Reactor," filed June 17, 1986 in the names of R. D. Nathenson and R. M. Slepian.

Description of the Prior Art

Early in the development of the liquid-metal fast breeder or nuclear reactor (LMFBR), it was recognized that liquid metals could be pumped by electromagnetic (EM) pumps. Such EM pumps offer the advantages of inherent simplicity and the lack of moving parts as compared with conventional, rotating impeller pumps. Such EM pumps offer the advantages of inherent simplicity and the lack of moving parts as compared with conventional, rotating impeller pumps. Such mechanical pumps have inherent problems associated with vibration or thermal distortion in areas of closely toleranced moving parts, such as bearings or seals. Furthermore, cavitation problems associated with a rotating impeller of mechanical pumps do not exist in an EM pump.

One such EM pump, known as a flow coupler, is particularly adapted to pump the primary flow of liquid metal to be heated by a core of the nuclear reactor. Such flow couplers transfer the internal energy of an intermediate flow of liquid metal to the primary flow, driving or pumping the primary flow.

Early examples of such flow couplers are described in U.S. Pat. No. 2,715,190 of Brill and UK Pat. No. 745,460 of Pulley. In a typical flow coupler, a driven liquid metal in the intermediate flow is directed through a generator duct of the flow coupler. Adjacent to the generator duct is a pump duct, through which flows the primary flow. The intermediate and primary flows of liquid metal within the generator and pump ducts are exposed to a common magnetic field. Passage of the first flow through the common magnetic field generates a relatively low voltage, which is applied to a circuit formed by the pump duct, a short, low resistance electrode disposed between the generator and pump ducts, and return conductors disposed on either side of the ducts. A large current will result in this circuit from the generated voltage. Interaction of the resulting high current in the pump duct with the common magnetic field drives the primary flow in the pump duct. In this manner, the intermediate flow of the liquid metal in the generator duct is "coupled" to the primary flow of the liquid metal in the pump duct. The use of such flow couplers in LMFBR systems is described in "Sodium Electrotechnology at the Risley Nuclear Power Development Laboratories", by D. F. Davidson et al., NUCLEAR ENERGY, 1981, Volume 20, February, no. 1, pp. 79–90. U.S. Pat. No. 4,469,471 of A. R. Keeton, et al. describes an improved embodiment of such a flow coupler.

In U.S. Pat. No. 4,412,785 of W. G. Roman, there described a flow coupler/heat exchanger assembly for use with a nuclear reactor. The assembly forms an annular region between inner and outer shells. A plurality of tube sets is disposed within the annular region, with relatively large spaces between adjacent tube sets. A magnetic field is established in a radial direction through the annular region. A first conductive fluid, e.g. the intermediate liquid metal, is pumped through the spaces between the tube sets by an enlarged intermediate pump. A second conductive fluid, e.g. the primary liquid metal, is introduced into the tube sets. The radial magnetic flux couples the flow of intermediate liquid metal with the flow of primary liquid metal. The externally pumped flow of the intermediate liquid metal in the spaces between the tube sets through the radial magnetic flux, produces a voltage and a current in a circumferential direction about the annular region. The current passes through the adjacent tubes and the primary liquid metal therein, producing a driving force in the opposite direction, whereby the primary liquid metal is driven or pumped.

In a publication entitled, "High-Efficiency DC Electromagnetic Pumps and Flow Couplers For LMFBRs," EPRI NP-1656, TPS 79-774, Final Report, January 1981, by I. R. McNab and C. C. Alexion, there is described an integral assembly of a heat exchanger and a flow coupler for a pool-type, LMFBR. A plurality of duct modules is disposed in a circle, with a magnetic field coil disposed between adjacent duct modules. Each duct module includes a pump duct through which the primary liquid metal flows and a generator duct through which the intermediate liquid metal flows in an opposite direction. The magnetic flux generated by the magnetic field coil is directed by an iron circuit to form a circular magnetic field through all of the duct modules. In one embodiment, the intermediate liquid metal is introduced into a centrally disposed inlet and directed downwardly to be introduced to an intermediate heat exchanger comprised of a plurality of vertically oriented tubes. The intermediate liquid metal is then directed upward and about these tubes, before being introduced into each of the generator ducts. The primary flow of liquid metal is directed downwardly through the pump ducts, exiting the pump ducts and being introduced into the tubes of the intermediate heat exchanger, flowing downwardly therethrough, before being discharged and recirculated to the nuclear core. It is contemplated that the flow coupler may be located beneath such an intermediate heat exchanger.

The above-identified application entitled, "A Pump-/Intermediate Heat Exchanger Assembly For A Liquid Metal Reactor," describes an assembly of a flow coupler and an intermediate heat exchanger for a nuclear reactor, wherein the flow coupler is disposed beneath the intermediate heat exchanger and in a co-linear relationship therewith. The primary liquid metal is directed from the reactor core and is introduced into the intermediate heat exchanger flowing down through an array of tubes enclosed in an annular cavity of the intermediate heat exchanger. The intermediate liquid metal is fed into the assembly via a centrally disposed "downcomer" pipe through the intermediate heat exchanger to the flow coupler and, in particular, to a first plenum for distributing the intermediate liquid metal to a plurality of flow couplers or duct modules, each comprised of one or more sets of pump and generator ducts. The intermediate liquid metal exits the plenum being directed up in parallel through the generator ducts of the flow coupler modules. The intermediate liquid metal exiting the pump ducts is collected in the second plenum before being introduced into the annular cavity to be heated by the primary liquid metal flowing downwardly through the tubes. After being heated, the intermediate liquid metal is discharged and directed to a steam generator. The cooled, primary liquid metal is discharged from the tubes into a third plenum, before it is directed downwardly in parallel through the plurality of generator ducts, whereby the cooled, intermediate liquid metal is directed at relatively high pressure, i.e. pumped, into a large plenum at the bottom of the nuclear reactor for return to the reactor core.

The above described flow coupler/intermediate heat exchanger assemblies all require electrical leads, which penetrate such assemblies and are connected to a plurality of their magnetic field coils. The field coils are excited by a current applied via the electrical leads to generate a magnetic field through an associated iron circuit, whereby a circular magnetic filed is directed through the pump and generator ducts of each duct module. The penetration by such electrical leads does increase the size of the flow coupler, as well as the entire flow coupler/heat exchanger assembly. In addition, remote power supplies must be connected to the other ends of the electrical leads to generate the required power for the magnetic field coils.

SUMMARY OF THE INVENTION

It is an object of this invention to provide a new and improved pump assembly to be incorporated into a nuclear reactor system.

It is a more specific object of this invention to provide a new and improved pump assembly, which reduces or eliminates the need for electrical leads to be inserted into the nuclear reactor system.

It is a still further object of this invention to provide a new and improved pump assembly for utilizing a portion of the pumped, intermediate liquid metal to generate an exciting current for the field coils associated with the intermediate and primary ducts of the pump assembly.

In accordance with these and other objects of this invention, there is provided a pump assembly for transferring the internal energy from a second or intermediate liquid metal to a first or primary liquid metal. The pump assembly comprises a pump duct for receiving the first liquid metal and a primary generator duct for receiving a first flow of the pumped, intermediate liquid metal. A first or main means in the illustrative form of a plurality of field coils generates and applies a main magnetic field through the pump and the primary generator ducts, whereby a first current flow is established through the pump and primary generator ducts and the primary liquid metal is pumped. An auxiliary generator duct receives a second flow of the pumped, intermediate liquid metal. An auxiliary means, illustratively in the form of permanent magnets, generates an auxiliary magnetic field through the auxiliary generator duct, whereby the interaction of the auxiliary magnetic field and the second flow of the pumped, intermediate liquid metal generates a second current flow to excite the field coils.

In a further aspect of this invention, a plurality of flow couplers or pumps is disposed in a circular array within the pump assembly. Each flow coupler includes at least one pump duct and one primary generator duct.

In an illustrative embodiment of this invention, a first chamber receives the pumped, intermediate liquid metal and directs in parallel first and second flows thereof to the auxiliary generator duct and the primary generator duct respectively. A second chamber is disposed in communication with the primary generator duct and the auxiliary generator duct for receiving therefrom in parallel the first and second flows of the pumped, intermediate liquid metal.

BRIEF DESCRIPTION OF THE DRAWINGS

The advantages, nature and additional features of the invention will become more apparent from the following description, taken in connection with the accompanying drawings, in which:

FIG. 1 is a simplified schematic of a nuclear liquid metal reactor system incorporating an assembly of a primary sodium pump (PSP) and heat exchanger in accordance with the teachings of this invention;

FIG. 5 is a top, sectioned view of the PSP as shown in FIG. 4, particularly illustrating the magnetofluid dynamic generator and its connection to a pair of magnetic fields coils associated with the duct modules; and FIGS. 6A and 6B are respectively a side, sectioned view of the field coil and the magnetofluid dynamic generator as taken along line 6A—6A of FIG. 5, and a front, sectioned view of the field coil as taken along line 6B—6B of FIG. 6A.

DESCRIPTION OF THE PREFERRED EMBODIMENTS

Figure 3:
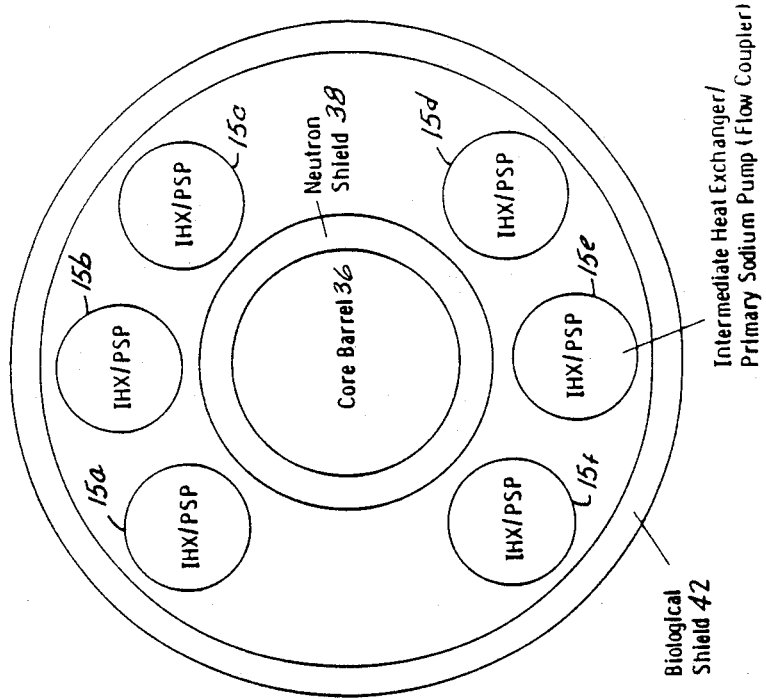
FIGS. 2 and 3 are respectively a simplified, broken away side view and a top, plan view of a pool-type, nuclear liquid metal reactor as shown in FIG. 1.

Referring now to the drawings and in particular to FIG. 1, there is shown a reactor system 10 including an assembly 15 of an intermediate heat exchanger (IHX) 16 and a flow coupler or primary sodium pump (PSP) 18. The IHX 16 and the PSP 18 are coupled in circuit with a primary loop or flow 14 of an electrically conductive fluid, such as sodium, and an intermediate loop or flow 20 of an electrically conductive fluid, e.g. sodium. As will be explained, the PSP 18 pumps the liquid metal about the primary loop 14 to and from a reactor core 12, where the primary fluid is heated to relatively high temperatures on the order of 500° C.

The IHX 16 transfers thermal energy from the heated primary liquid metal to the intermediate liquid metal. In the intermediate loop 20, a mechanical pump 22 pumps the intermediate liquid metal through an inlet conduit 21 to the PSP 18 in the form of a flow coupler, which as will be explained in detail below transfers the internal energy from the driven intermediate liquid metal to the primary liquid metal; it is contemplated that the mechanical pump 22 must be of increased capacity to also drive the primary liquid metal. The intermediate liquid metal passes through the IHX 16 receiving thermal energy from the primary liquid metal as heated by the core 12 and passes via outlet conduit 23 to a steam generator 24.

A vaporizable fluid, such as water, is circulated through the steam generator 24, whereby the water is vaporized, before being circulated about a steam loop 34 to a turbine 26, whereby the impellers of the turbine 26 are rotated to drive an electric generator 28, which in turn outputs electrical energy. The spent vapor leaves the turbine 26 and is condensed by a condenser 30, before returning to the condensate pump 32, to be recirculated through the steam generator 24.

Figure 2:
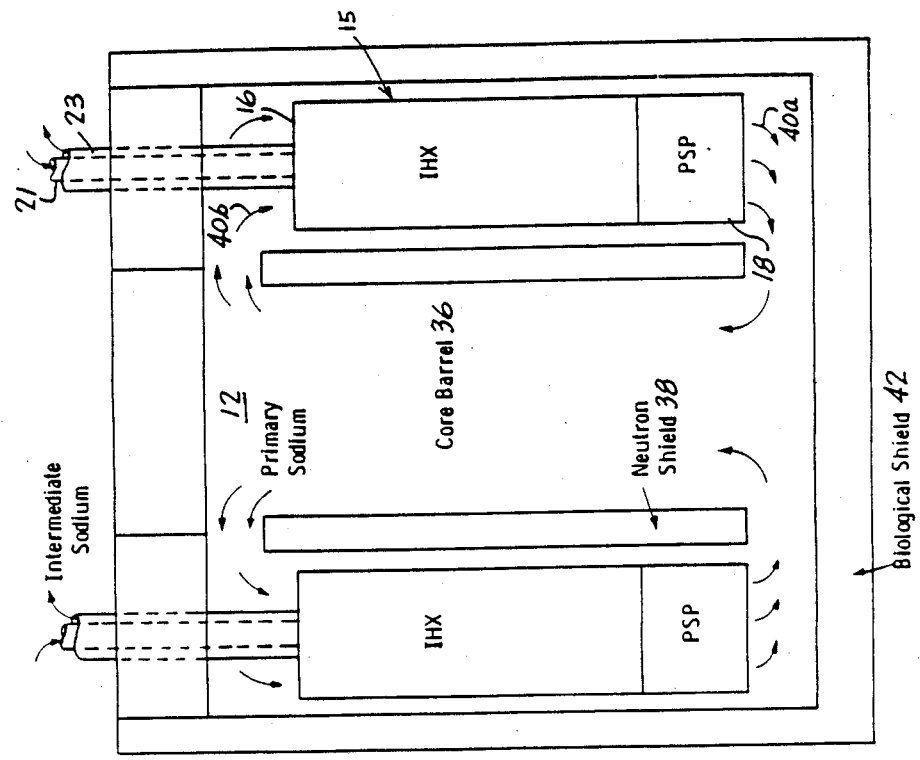

A plurality of the PSP/IHX assemblies 15 is incorporated within the annular region surrounding a reactor core 12 of a pool type reactor, as illustratively shown in FIGS. 2 and 3. Six such PSP/IHX assemblies 15a to 15f are disposed in a circular array about a core barrel 36, as shown in FIG. 3. A biological shield 42 surrounds the core barrel 36. The intermediate liquid metal is directed via inlet conduit 21 to the IHX 16 and discharged therefrom via conduit 23. The primary liquid metal is pumped by the PSPs 18 about a neutron shield 38 as shown by arrows 40a to be heated within the core barrel 36, before being returned as indicated by the arrows 40b to each of the plurality of IHXs 16.

Figure 4:
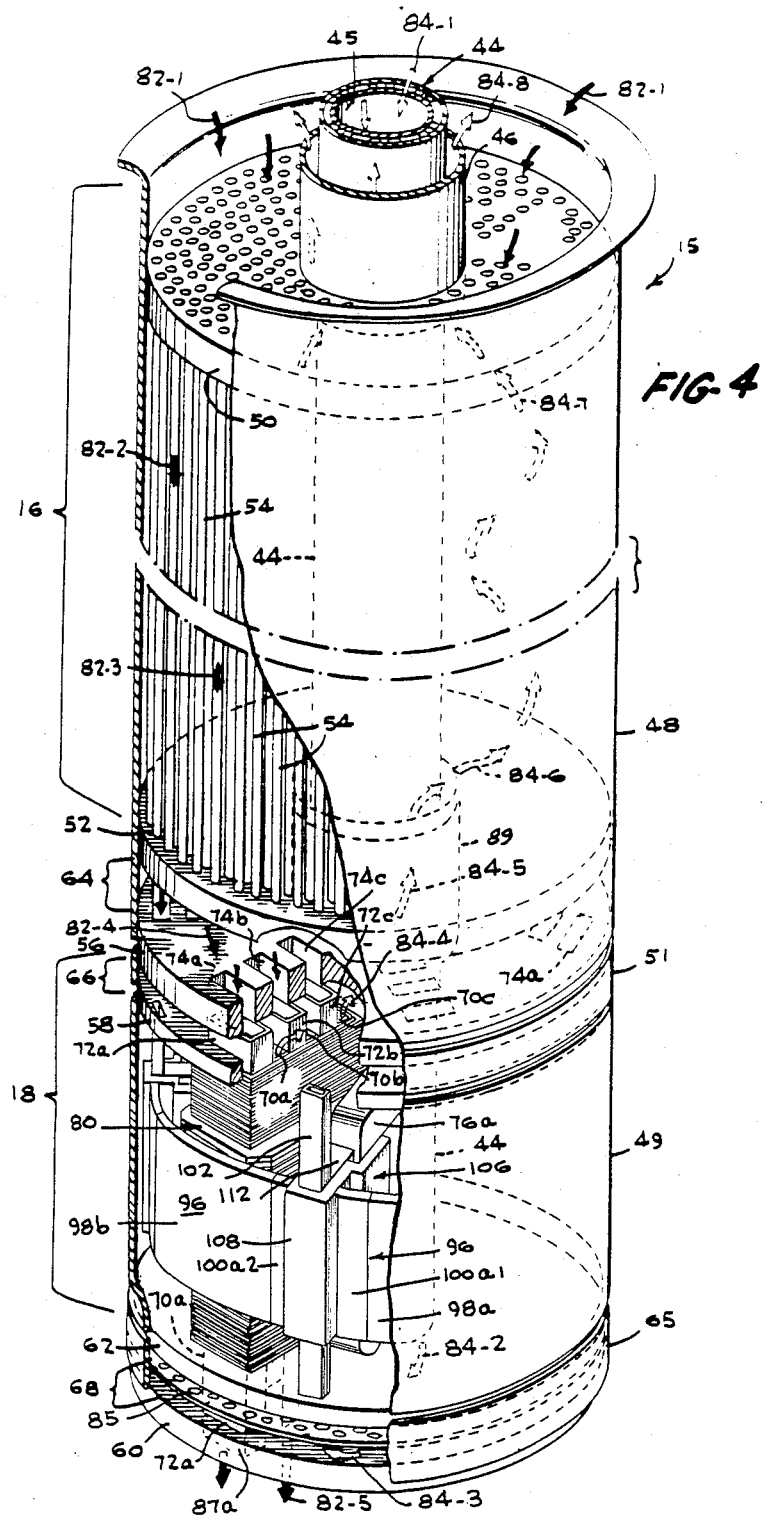
FIG. 4 is a detailed, perspective view of the PSP/heat exchanger assembly as generally shown in each of FIGS. 1, 2 and 3, incorporating the magnetofluid dynamic generator for exciting the magnetic field coils of the PSP, in accordance with the teachings of this invention.

Additional details of the PSP/IHX assembly 15 are shown in FIG. 4. The inlet conduit 21 is coupled to outer and inner downcomer pipes 44 and 45, which extend axially along substantially the entire length of the assembly 15 for introducing the intermediate liquid metal into a flow coupler lower diffuser 68, disposed at the bottom of the assembly 15. The intermediate liquid metal is directed as indicated by the arrows 84 through the PSP 8 and the IHX 16 to exit via an intermediate outlet conduit 46, which is disposed concentrically about the pipes 44 and 45 and is coupled to the outlet conduit 23 for conveying the intermediate liquid metal in the intermediate loop 20.

The PSP/IHX assembly 15 includes an IHX outer shell 8, which encloses the IHX 16 and supports at its upper end, an upper tube sheet 50 and at its lower end, a lower tube sheet 52. The upper and lower tube sheets 50 and 52 support therebetween an array of tubes 54. The tubes 54 are spaced from each other and disposed in that annular space formed between the IHX outer shell 48 and the intermediate outlet conduit 46. As indicated by the arrows 84, the intermediate liquid metal flows about the tubes 54 and through this annular space. The primary liquid metal flows as indicated by the arrows 82 through the tubes 54, exiting from their lower ends into a IHX lower plenum 64. The lower end of the plenum 64 is enclosed by an annularly shaped, outer upper support plate 56. A plurality of sets of plate openings 74a, 74b and 74c is disposed about the plate 56, the plate openings 74a, 74b and 74c passing through the width of the plate 56 for discharging the primary liquid metal.

The PSP/IHX assembly 15 includes a PSP outer shell 49, which encloses and houses the PSP 18. The PSP outer shell 49 supports at its upper end, an inner, upper support plate 58, which includes a plurality of sets of openings disposed thereabout, for permitting the passage upwardly, therethrough of the intermediate liquid metal as suggested by the arrows 84. An intermediate shell 51 overlaps at its upper and lower edges, the outer upper support plate 56 and the inner, upper support plate 58, respectively. The plates 56 and 58 and the intermediate shell 51 define a flow coupler upper plenum 66 for receiving and directing the intermediate liquid metal as it passes upwardly from the PSP 18 and into an interconnecting, annular passage formed between the outer downcomer pipe 44 and an intermediate conduit 46 disposed concentrically about the pipe 44. Since the upper ends of each of the pump ducts 72a, 72b, and 72c are supported by the outer, upper support plate 56 and the upper ends of the a plurality of generator ducts 70 are supported by the inner, upper support plate 58, the plurality of tubes 54 of the IHX 16 may be disposed in a compact array and evenly spaced from each other, whereby the flow of the primary liquid metal may be increased and the diameter or cross-sectional dimension of the PSP/IHX assembly 15 may be minimized.

The PSP outer shell 49 supports at its lower end an inner lower support plate 62. The outer, lower support plate 60 is spaced below from the plate 62 and forms with a lower shell 65 the flow coupler lower diffuser 68 for receiving from the downcomer pipe 44 the intermediate liquid metal and for redirecting it upward through an open grid 85 through openings within the plate 62 and through the PSP 18 as indicated by the arrows 84. The 50% open grid 85 breaks up any eddies and provides a uniform flow of the intermediate liquid metal entering the PSP 18. The flow coupler lower diffuser 68 is configured and dimensioned for minimum pressure loss.

The outer, lower support plate 60 is supported simply by the PSP outer shell 49 through the lower shell 65, while its inner portions are left unsupported. The inner, upper support plate 58 and the inner, lower support plate 62 are supported at their outer peripheries by the PSP outer shell 49 and on their inner peripheries by an inner shell 89. The PSP outer shell 49 and the inner shell 89 are designed to resist the internal pressure, axial weight, and vertical seismic loads imposed by and upon the PSP/IHX assembly 15. The design and configuration of the assembly 15 has been carried out to avoid possible buckling of the shells 48 and 49. Horizontal seismic loads should not pose a problem, since the PSP/IHX assembly 15 resides in a closely toleranced support tube filled with pool sodium as a shock absorber.

Referring now to FIG. 5 in addition to FIG. 4, the PSP 18 illustratively comprises a plurality of individual flow couplers in the form of duct modules 69, modules 69a and 69b being illustrated in FIG. 5. Each duct module 69 comprises a plurality of intermediate or generator ducts 70a, 70b and 70c, and a second pair of primary or pump ducts 72a, 72b and 72c. Illustratively, the intermediate ducts 70 are disposed between the primary ducts 72 forming a sequence beginning at the PSP outer shell 49 of a primary duct 72a followed by the intermediate duct 70a, the primary duct 72b, the intermediate duct 70b, the primary duct 72c and the intermediate duct 70c. The intermediate liquid metal passes as indicated by the arrows 84 upwardly through each of the intermediate ducts 70a, 70b and 70c of each duct module 69 or flow coupler, before being introduced collectively into the flow coupler upper plenum 66. The primary liquid metal as indicated by the arrows 82 flows downwardly through the plurality of sets of openings 74a, 74b and 74c into corresponding primary ducts 72a, 72b and 72c, flowing downwardly therethrough to be discharged through a set of outlet openings 87a, 87b and 87c (openings 87b and 87c not shown), respectively. It is understood that each duct module 69 has its own corresponding set of outlet openings 87a, 87b and 87c within the outer, lower support plate 60.

Referring particularly to FIGS. 4 and 5, a toroidally shaped magnetic field is formed by a set of excitation coils 76, 76a and 76b being illustrated in FIG. 5. Each excitation coil 76 is disposed between an adjacent pair of duct modules 69, and about its magnetic pole piece 78, which forms the magnetic field generated by each excitation coil 76 to be directed across that air gap in which one of the duct modules 69 is disposed. The use of plural excitation coils 76 in the PSP 18 is for redundancy. In accordance with the teachings of this invention, each coil 76 is separately powered by its own bootstrap generator 101.

The PSP 18 includes in an illustrative embodiment 18 primary ducts 72 and 18 intermediate ducts 70. An adjacent pair of one primary duct 72 and one intermediate duct 70 form a flow coupler. In this illustrative embodiment, there are 18 such flow couplers. A set of three of such flow couplers comprised of six ducts 70 and 72, form one of the duct modules 69 as shown in FIGS. 4 and 5. Each duct module 69 acts in parallel with each other to transfer at high efficiency the internal energy in the form of a relatively high hydraulic head or pressure of the intermediate sodium as established by the mechanical pump 22 to the primary liquid metal by action of the coupled electric currents and magnetic field. Such coupling is based on the Lorentz relation where the force $\vec{F}$ on a charge $q_o$ moving through a magnetic field $\vec{B}$ with velocity $\vec{V}$ is expressed by the relation:

$$\vec{F} = q_o \vec{V} \times \vec{B}.$$

As this is a vector relationship, the force $\vec{F}$ is maximized when velocity $\vec{V}$ perpendicular to the magnetic field $\vec{B}$. The excitation coils 76 create a toroidally-shaped magnetic field as indicated by the arrows 75, which passes through each of the flow couplers of each duct module 69.

As the magnetic field as indicated by the arrows 75 passes through each of the intermediate ducts 70, the interaction of the intermediate liquid metal pumped upwardly along a line perpendicular to the face of FIG. 5 and the magnetic field directed at right angles to that line, generates an electric potential gradient and causes a current to flow radially inward through the ducts 70 and 72 toward the center of the PSP 18, as indicated by the dotted line 73a. Each duct module 69 is formed within a laminate structure 80, which provides a pair of effective return paths 73b about the ducts 70 and 72 before being reintroduced into the primary duct 72a. As shown in FIG. 5, the laminate structure 80 is comprised of a composite plate 86 and a return conductor or plate 94, alternately stacked one upon the other to form the laminate structure 80. The plate is uniformly made of a highly conductive material such as copper. The plates 86 and 94 may also be secured together by electrically insulated bolts. Each composite plate 86 comprises a pair of side element 88a and 88b as made of a magnetic material such as a magnetic steel for directing the magnetic field therethrough, and top and bottom elements 90a and 90b made of a high strength, electrically conductive, non-magnetic material such as stainless steel. A pair of top and bottom electrodes 91a and 91b is disposed vertically along the active length of each of the primary duct 72a and the intermediate duct 70c, respectively. The top and bottom electrodes are made of a suitable highly electrically conductive material such as copper. Further, the side elements 88a and 88b are intermediately connected with the magnetic pole piece 78 to ensure the efficient transmission of the magnetic field flow 75. A plurality of center plates 92a–92e is disposed between each of the adjacent primary ducts 72 and intermediate ducts 70. The center plates 92 are made of a suitable highly electrically conducted material such as copper.

The current flow within each duct module 69 and its laminate structure 80 is electrically isolated from another. The interaction between the current flow directed radially inward along the path 73a through the primary or pump ducts 72a, 72b and 72c, and the magnetic field directed perpendicular to such current flow as indicated by the arrow 75, imposes a force on the primary liquid metal within the primary ducts 72a, 72b and 72c pumping the primary liquid metal downwardly along a line perpendicular with respect to and into the page of FIG. 5. The intermediate ducts 70 are alternated with the primary ducts 72 to avoid circulating end currents therein. Each of the ducts 70 or 72 is sized individually, as shown in FIG. 5, to be of optimal proportion. The toroidal magnetic field geometry makes optimal use of the space within the PSP outer shell 49, making it possible to keep the outer diameter of the PSP outer shell 49 of approximately the same size as that of the IHX outer shell 48. Further, the toroidal configuration of the magnetic field minimizes the amount of iron within the plurality of the pole pieces 78a to 78f.

Referring now to FIGS. 4 and 5, a brief summary of the hydraulic flows of the intermediate and primary liquid metals will be given. The arrows 84-1 to 84-8 indicate the flow of the intermediate liquid metal through the PSP/IHX assembly 15, starting with arrow 84-1 indicating where the flow of the intermediate liquid metal begins and arrow 84-8 indicating where the intermediate liquid metal exits from the assembly 15. The intermediate liquid metal is received from the inlet conduit 21 of the intermediate loop 20, as shown in FIG. 1, and is directed downward through the downcomer pipes 45 and into the flow coupler lower diffuser 68, where the flow of the intermediate liquid metal is reversed, directing the intermediate liquid metal back upward through each set of the intermediate ducts 70a, 70b and 70c of each of the duct modules 69. The parallel flows of the intermediate liquid metal through the 6 sets of intermediate ducts 70, is introduced into the flow coupler upper plenum 66, which collects and directs with a minimum loss of pressure the intermediate liquid metal upward through the annulus formed by a conduit 89 and the downcomer pipe 44, and into the IHX 16. The intermediate liquid metal flows upwardly through the IHX 16 circulating about and through the spaces between the tubes 54, before being discharged through the intermediate outlet conduit 46, to be returned by the outlet conduit 23 to the intermediate loop 20.

a similar fashion, the primary liquid metal is directed through the PSP/IHX assembly 15 along the path and in the sequence as indicated by the arrows 82-1 to 82-6. The heated primary liquid metal is returned from the reactor core 12 and is introduced into the tubes 54 of the IHX 16, giving up its thermal energy to the intermediate liquid metal flowing thereabout. The cooled primary liquid metal exits the tubes 54 into the IHX lower plenum 64. The primary liquid metal continues its downward path through the openings 74a, 74b, and 74c, and into each of a plurality of sets of the primary ducts 72a, 72b and 72c flowing downwardly therethrough and being pumped, before being discharged through outlet openings 87a and 87b and returned via the primary loop 14 to the reactor core 12.

Referring now to FIGS. 4 and 5, there is shown a magnetofluid dynamic or bootstrap generator 101 for generating and applying excitation current to each of the field coils 76 of the PSP 18. As suggested in the drawings, a plurality of the duct modules 69a to 69f, e.g. six, is disposed in a circular array within the outer shell 49 of the PSP 18. A field coil 76 is disposed between adjacent duct modules 69 and is associated with its bootstrap generator 101, which supplies excitation current thereto, as will be explained. The excitation current flows through the field coil 76 generating the main magnetic field as indicated by the arrow 75. The field 75 is annularly shaped to flow about and through the intermediate ducts 70 and the primary ducts 72 of each of the duct modules 69.

As most clearly shown in FIG. 4, each bootstrap generator 101 includes a bootstrap generator duct 102 for receiving a second or auxiliary flow of the intermediate liquid metal directed upward from the flow coupler lower diffuser 68 through the duct 102, before exiting into the flow coupler upper plenum 66. The auxiliary flow of the intermediate liquid metal from the duct 102 mixes with a first or main flow of the intermediate liquid metal exiting from the intermediate ducts 70, and is directed upward as shown by the arrows 84 through the annular passage formed by the conduit 89 and the downcomer pipe 44 and through the IHX 16, before being discharged through the intermediate outlet conduit 46.

The bootstrap generator duct 102 is made of a suitable high-strength, electrically conductive material such as stainless steel and is of substantially square configuration as shown in FIG. 5. The intermediate liquid metal flows upward from the bottom of the PSP 18 and out of the page as shown in FIG. 5. A part of a magnetic field generator 96 is shown in FIG. 5. The magnetic field generator 96 is of circular configuration enclosing the plurality of duct modules 69 and the field coils 76. The magnetic field generator 96 includes a plurality of permanent magnet sections, sections 98a and 98b being illustrated in FIG. 5. Each section 98 is made of a permanent magnet material having poles oriented to establish an auxiliary magnetic field indicated by the arrow marked with the number 97. A pair of magnetic pole pieces 100a1 and 100a2 is interposed between the permanent magnet sections 98a and 98b to direct the auxiliary magnetic field 97 through the bootstrap generator duct 102. In a manner similar to that described above, the interaction between the auxiliary magnetic field 97 and the pumped intermediate liquid metal flowing through the duct 102, generates a voltage across the duct 102 to cause a second or auxiliary current to flow through the duct 102 and the second flow of the intermediate liquid metal therein, as will be explained in detail below.

The magnetic field generator 96 is provided with a bootstrap generator buswork 106 for coupling the second current flow so generated to its field coil 76. As shown in FIG. 5, the bootstrap generator buswork 106 includes a lead-in conductor 112, as shown in FIGS. 5 and 6A, disposed with one end in electrical contact with a side of the bootstrap generator duct 102 and extending so that its one end is in electrical contact with the field coil 76. The circuit through the field coil 76 is completed by a return conductor 108 shown in section in FIG. 5 as comprising a pair of conductor legs 110a and 110b, each connected respectively to one of a pair of output coil segments 120a and 120b of the field coil 76.

As illustrated in FIG. 6A and 6B, the field coil 76 is comprised of but a single coil turn 116 starting with an input coil segment 118 as shown in FIG. 6B. The single coil turn 116 conducts the current thereabout and terminates in the output coil segments 120a and 120b. An insulation layer 122 separates the output coil segments 120a and 120b from the input coil segment 118. As illustrated in FIGS. 6A and 5, the conductor legs 110a and 110b are respectively connected with the output coil segments 120a and 120b, whereas the lead-in conductor 112 is coupled electrically to the input coil segment 118. Thus as shown in FIG. 5, a complete circuit for the current generated within the bootstrap generator duct 102 is established. As illustrated in FIG. 5, the current flows along a first segment path 114a from the duct 102 through the lead-in conductor 112 to the input coil segment 118. The current flows about the coil turn 116 to the output coil segments 120a and 120b, and then along the current paths 114b through the conductor legs 110a and 110b to the top side of the bootstrap generator duct 102, as shown in FIG. 5. The use of the single coil turn 116 as shown in FIGS. 6A and 6B, eliminates the insulation requirements for the field coil 76, whereby the single coil turn 116 may have a higher copper content for a given volume and thus lower electrical losses. In addition, the single coil turn 116 should operate at lower temperatures due to the elimination of much insulation, thus avoiding the use of additional cooling means.

The auxiliary magnetic field 97 is illustratively generated by the permanent magnet sections 98, which illustratively may be made of Alnico-6. In an alternative embodiment of this invention, the permanent magnetic sections 98 may be replaced by an electromagnetic coil. The disadvantage of such electrical coils is that electrical leads must be directed into the reactor core 12, thus increasing the size of the PSP/IHX assembly 15.

The establishment of the parallel first and second flows of the intermediate liquid metal through the intermediate ducts 70 and the bootstrap generator ducts 102 requires that the flow rate of the mechanical pump 22 in the intermediate sodium loop 20 must be increased by the amount of the second flow utilized by the magnetic field generators 96. Alternatively, the design of the intermediate and primary duct 70 and 72 could be changed to increase the flow amplification so that the same primary flow of liquid metal is induced by the reduced intermediate flow. Illustratively, the dimensions of the intermediate ducts 70 could be changed and, in particular, its width decreased, whereby the current thereacross is increased.

In an illustrative embodiment, the field coil 76 may be operated at 160 kA-T at 0.475 V. Such low voltage, high current requirements of the excitation main coil 76 match the output characteristics of the bootstrap generators 101. The output voltage of the bootstrap generator 101 is illustratively 0.508 V to accommodate the expected resistance of the bootstrap generator buswork 106. These generators 101 require as indicated above that the intermediate flow or flow amplification be increased by 8.8 percent. Excitation requirements for the bootstrap generator 101 are a flux of a 0.109 W and a magnetomotive force (MMF) of 63.7 kA-T. These values correspond to 40% of the MMF and 10% of the flux that the main field coils 96 are require to supply. As suggested above the required auxiliary magnetic field 97 maybe supplied by permanent magnet sections 98 made of Alnico-6. The circumferential length of such sections 98 is 4 feet and the radial height is 3 inches.

The use of electromagnetics in place of the permanent magnet sections 98 would maintain the control flexibility by permitting a change of the strength of the auxiliary magnetic field 97, but would require penetration by the electrical leads in the order of 40% of those of the prior art pumps having penetration for electrical leads to excite their main field coils.

Since numerous modifications may be made in the above-described apparatus without departing from the spirit and scope of the invention, it is intended that the foregoing description be interpreted as illustrative, and not in a limiting sense.

What is claimed:

1. A pump assembly for transferring internal energy from a second, pumped electrically conductive fluid to a first electrically conductive fluid, said pump assembly comprising:
   (a) a pump duct for receiving said first fluid;
   (b) a primary generator duct for receiving a first flow of said second, pumped fluid;
   (c) main means excitable for generating a main magnetic field through said pump duct and said primary generator duct, whereby the interaction of said main magnetic field and said first flow of said second, pumped fluid generates a first current flow through said pump duct and said primary generator duct and pumps said first fluid through said pump duct;
   (d) an auxiliary generator duct for receiving a second flow of said second, pumped fluid; and
   (e) auxiliary means for generating an auxiliary magnetic field through said auxiliary generator duct, whereby the interaction of said auxiliary magnetic field and said second flow of said second, pumped fluid generates a second current flow applied to excite said main generating means.

2. The pump assembly as claimed in claim 1, wherein said auxiliary means comprises a permanent magnetic.

3. The pump assembly as claimed in claim 1, wherein each of said primary generator duct and said auxiliary generator duct comprises input and output ends, and said pump assembly further comprises means for introducing said first and second flows of said second, pumped fluid in parallel into said input ends of said primary generator duct and said auxiliary generator duct.

4. The pump assembly as claimed in claim 3, wherein said introducing means comprises a first chamber for receiving said second, pumped fluid and in communication with said input ends of each of said primary generator duct and said auxiliary generator duct.

5. The pump assembly as claimed in claim 4, wherein there is further included a second chamber in communication with said output ends of each of said primary generator duct and said auxiliary generator duct for receiving therefrom in parallel said first and second flows of said second, pumped fluid.

6. The pump assembly as claimed in claim 1, wherein there is included a plurality of flow couplers, each comprised of said pump duct and said primary generator duct, and a field coil is disposed between adjacent ones of said plurality of said flow couplers.

7. The pump assembly as claimed in claim 6, wherein said plurality of said flow couplers is disposed in a circular array, and said plurality of said field coils generates said main magnetic field along a first circular path.

8. The pump assembly as claimed in claim 7, wherein said auxiliary generating means generates said auxiliary magnetic field along a second, circular path.

9. The pump assembly as claimed in claim 8, wherein there is included a plurality of said auxiliary generator ducts, one of said plurality of said auxiliary generator ducts being associated with each of said field coils.

10. The pump assembly as claimed in claim 9, wherein said plurality of field coils is disposed in a first circular array and said plurality of auxiliary generator ducts is disposed in a second circular array about said first circular array.

11. The pump assembly as claimed in claim 10, wherein said auxiliary generating means comprises a plurality of magnetic sections, disposed in a third circular array about said first circular array of flow couplers for generating said auxiliary magnetic field in a circular configuration to pass through each of said plurality of said auxiliary generator ducts.

12. The pump assembly as claimed in claim 6, wherein said field coil comprises a turn having input and output end terminals, and a buswork for coupling said input and output end terminals to said auxiliary generator duct in a closed circuit therebetween for applying said second current flow to said field coil.

13. The pump assembly as claimed in claim 1, wherein said main generating means comprises a field coil consisting of a single turn having an input terminal and an output terminal disposed on its respective ends.

14. The pump assembly as claimed in claim 13, wherein said input terminal comprises a single input segment and said output terminal comprises first and second output segments disposed on either side of said input segment.

15. The pump assembly as claimed in claim 14, wherein said auxiliary generator duct comprises first and second opposing sides, and third and fourth opposing sides, and there is further included a buswork comprising an input conductor for applying said second current flow from said first side to said input segment and a return conductor having a first leg coupling said first output segment to said second side and a second leg coupling said second output segment to said second side.

16. The pump assembly as claimed in claim 15, wherein there is further included means for insulating said third and fourth sides from said first and second legs of said return conductor.

* * * * *